UNITED STATES PATENT OFFICE.

JOHANN L. KLEINSCHMIDT, OF ST. LOUIS, MISSOURI.

IMPROVEMENT IN TREATING COBALT ORES TO OBTAIN SMALT, ZAFFRE, &c.

Specification forming part of Letters Patent No. 156,739, dated November 10, 1874; application filed October 5, 1874.

*To all whom it may concern:*

Be it known that I, JOHANN L. KLEINSCHMIDT, of city and county of St. Louis and State of Missouri, have invented an Improved Process of Gaining a Pure Silicate of Cobalt, of which the following is a specification:

After the cobalt and nickel are concentrated by a suitable melting process from the poorer ores into a richer cake or lump, speiss, or matte, as free from iron as possible, this cake is placed into a small blast-furnace, similar to a copper-refining furnace, whose hearth is constructed of quartz-sand, which should also be perfectly pure and free from iron. This hearth is heavily coated by a concentrated solution of silicate of potash or soda, and, if cautiously dried and slowly heated, is very solid and durable.

When the hearth is well heated, being covered by a layer of heated coal, the metallic cake is placed on the same, quickly brought to fusion, and exposed to a continuous blast until the contents of the hearth are covered with cobaltic slag. Now the coal is removed, the slag kept under a weak blast until it cools off, then the solidified crust of slags is drawn, and this manipulation repeated until the greater part of the cobalt is consumed by the scorification, which is effected by the silicious acid of the quartz-sand.

When the bright metal appears, the fused matter is again covered with coal, a fresh supply of sand added, and the operation repeated.

To aid the formation of slag and the fusion toward the end of the operation, I add some sulphur, under a frequent stirring with poles or spars of wood. Since it occurs frequently that in the presence of coal some of the oxide of cobalt is reduced, and the regulus separates in granules on the edge of the hearth, it is preferable to conduct the whole process in a reverberatory furnace, whose hearth is constructed of pure quartz-sand mixed with pure soda, pure potash, or their silicate. The slag is drawn with a wooden scraper. The scoriæ which are thus obtained during the different phases of the operation, must be kept separate, as the first issue contains some iron (greenish blue,) the last some nickel, (reddish blue,) and those of the middle period only being pure blue. Grains of sand, arseniate, and sulphide of the metal which may mechanically adhere to the slag, are scraped off. The slag from the middle period, which generally consists of pure silicate of cobalt, and contains only small portions of arsenic or potassium, may be directly used for smalt, as the metallic particles settle during the melting of the glass, or it may be submitted to a repeated reduction with soda and metallic arsenic and a repeated scorification, which yields a zaffre whose product is the rich and nice blue on china.

This repeated reduction is necessary when the proportion of cobalt and nickel in the ore is one to ten, or less; also with the first and last products of the first scorification. It is very practicable to mix both of the impure issues of slag, and melt them with arsenic and soda, or the arseniate of soda, which may be gained as a by-product from the refining of the nickel. Hereby the iron goes into a slag, and the metal is then treated as aforesaid.

The advantage of my process is the generation of a comparatively pure silicate of cobalt by a simple melting operation, which silicate, prior to my invention, could only be obtained from a solution; therefore,

What I claim as my invention, and desire to secure by Letters Patent, is—

The production of a pure silicate of cobalt, and, as its consequence, the separation of cobalt from nickel, and the formation of oxide of cobalt, or smalt, or other cobaltic products directly from the matte or speiss, by a successive melting process, under simultaneous application of pure silicious sand and a current of air, either in a hearth or a reverberatory furnace, substantially as above described.

JOHANN LUDWIG KLEINSCHMIDT.

Witnesses:
EDMUND F. SCHREINER,
ADOLPH E. SCHMIDT.